United States Patent [19]

Sakamoto et al.

[11] Patent Number: 5,356,352
[45] Date of Patent: Oct. 18, 1994

[54] BEARING ARRANGEMENT FOR A PLANET PINION

[75] Inventors: Kenichi Sakamoto; Muneo Mizuta; Hiroshi Noguchi, all of Fuji, Japan

[73] Assignee: Jatco Corporation, Fuji, Japan

[21] Appl. No.: 919,489

[22] Filed: Jul. 27, 1992

[30] Foreign Application Priority Data

Jul. 26, 1991 [JP] Japan ................. 3-187871
Jul. 26, 1991 [JP] Japan ................. 3-187885

[51] Int. Cl.⁵ ............................................ F16H 1/28
[52] U.S. Cl. ................................ 475/348; 384/564
[58] Field of Search ............... 475/331, 348; 384/424, 384/564, 569, 126

[56] References Cited

U.S. PATENT DOCUMENTS

| 2,043,261 | 6/1936 | Neuland | 475/348 X |
|---|---|---|---|
| 2,505,002 | 4/1950 | Orr | 475/348 X |
| 2,804,785 | 9/1957 | Mendez | 475/348 X |
| 3,293,948 | 12/1966 | Jarchow et al. | 475/348 X |
| 3,344,689 | 10/1967 | Naumann | 475/348 |
| 4,480,492 | 11/1984 | Fujioka et al. | 475/348 X |
| 4,562,903 | 1/1986 | Rogier | 475/331 X |
| 4,776,237 | 10/1988 | Premiski et al. | 475/348 X |
| 4,901,601 | 2/1990 | Leggat | 475/331 X |
| 5,188,576 | 2/1993 | Maguire et al. | 475/348 |

FOREIGN PATENT DOCUMENTS

| 2652652 | 5/1978 | Fed. Rep. of Germany | 475/331 |
|---|---|---|---|
| 577393 | 9/1924 | France | 384/564 |
| 3-09145 | 1/1991 | Japan | 475/331 |
| 185489 | 7/1936 | Switzerland | 384/564 |
| 257817 | 4/1949 | Switzerland | 384/564 |

Primary Examiner—Dirk Wright
Assistant Examiner—Khoi O. Ta
Attorney, Agent, or Firm—Foley & Lardner

[57] ABSTRACT

In a planetary gear set, a pinion shaft extending through one of planetary pinions has one and opposite end portions supported by two spaced plate portions of a carrier. Needle bearings are disposed between the pinion and the pinion shaft. Pinion washers extend around the piston shaft and radially between the pinions and the adjacent plate portions of the carrier. In order to withstand a thrust which the needle bearings are subjected to, the pinion washers have integral portions extending axially into spaces defined between the pinion, the needle bearings and the spaced plate portions of the carrier. Alternatively, the pinion shaft may have integral portions extending radially into the spaces.

4 Claims, 3 Drawing Sheets

BEARING ARRANGEMENT FOR A PLANET PINION

BACKGROUND OF THE INVENTION

The present invention relates to a planetary gear set.

A known planetary gear set comprises a sun gear, a pinion carrier and a ring gear. The pinion carrier rotatably supports a plurality of pinions, each in mesh with the sun and ring gears. In order to support the pinions, a pinion shaft extends through each of the pinions and has one and opposite end portions fixedly supported by axially spaced plate portions of the carrier, and needle bearings are disposed between the pinion and the pinion shaft. There is a growing demand for miniaturization of planetary gear sets. To meet this growing demand, difficulty has been experienced in constructing gear sets which can withstand the thrust to which the needle bearings are subjected upon rotation of the associated pinion. This is because the use of an O-ring within a narrow space available for withstanding the thrust results in generation of heat. Thus, the use of O-ring is impractical.

An object of the present invention is to construct a planetary gear set which can withstand the thrust to which the needle bearings are subjected without any substantial generation of heat.

SUMMARY OF THE INVENTION

According to the present invention, a planetary gear set is provided with:

a pinion having one and opposite axial ends;

a carrier;

a pinion shaft extending through said pinion and having one and opposite end portions supported by said carrier;

a needle bearing disposed between said pinion and said pinion shaft;

pinion washer means extending around said pinion shaft and between each of said one and opposite axial ends of said pinion and the adjacent portion of said carrier, said pinion washer means being operable to withstand a thrust which said pinion is subjected to;

means integral with one of said pinion shaft and said pinion washer means for withstanding the thrust to which said needle bearing is subjected.

DESCRIPTION OF THE PREFERRED EMBODIMENTS

Figure 1:
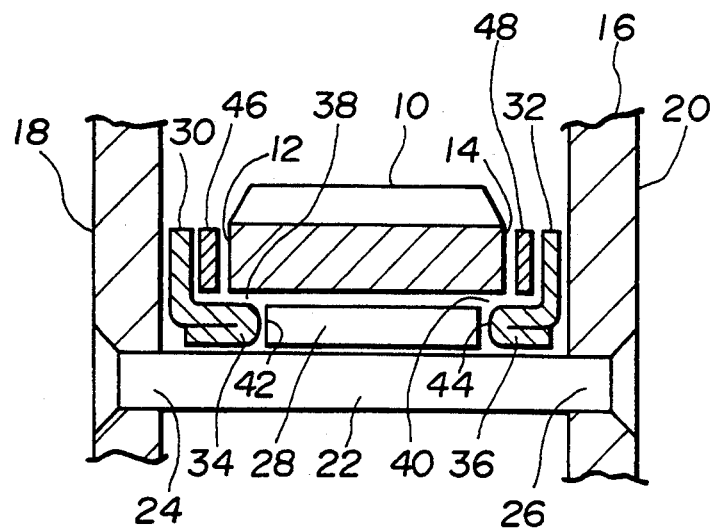
FIG. 1 is a fragmentary view of a planetary gear set showing in section how a pinion is supported on a pinion shaft.
Figure 2:
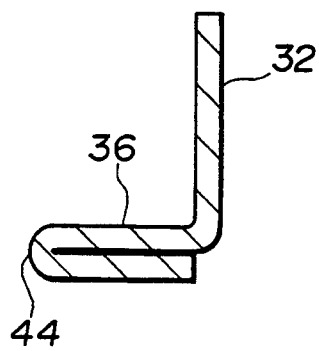
FIG. 2 is an enlarged fragmentary section of a pinion washer illustrated in FIG. 1.

Referring to FIG. 1, there is shown an upper half of a pinion 10 with a gear to be engaged therewith removed. The pinion 10 has one or first axial end 12 and the opposite or second axial end 14. A pinion carrier 16 is fragmentary shown and includes two axially spaced plate portions 18 and 20. A pinion shaft 22 extends through the pinion 10 and has one or first end portion 24 fixedly supported by the plate portion 18 of the carrier 16 and the opposite or second end portion 26 fixedly supported by the plate portion 20 of the carrier 16. Disposed between the pinion 10 and the pinion shaft 22 are a plurality of needle bearings 28. Extending around the pinion shaft 22 are pinion washers 30 and 32. The pinion washer 30 extends radially between the first axial end 12 of the pinion 10 and the adjacent plate portion 18 of the carrier 16. Similarly, the pinion washer 32 extends radially and between the second axial end 14 of the pinion 10 and the adjacent plate portion 20 of the carrier 16. The pinion washer 30 has an integral portion 34 extending into a space 38 defined between the pinion 10, the needle bearings 28, the pinion shaft 22 and the adjacent plate portion 18 of the carrier 16. Similarly, the pinion washer 32 has an integral portion 36 extending into a space 40 defined between the pinion 10, the needle bearings 28, the pinion shaft 22 and the adjacent plate portion 20 of the carrier 16. As readily seen from FIG. 2, each of these integral portions 34 and 36 is a laminated sleeve-like structure formed by turning an inner peripheral portion of the pinion washer. The integral portions 34 and 36 of the pinion washers 30 and 32 are provided with thrust acting faces 42 and 44 arranged to slidably contact with the adjacent ends of the needle bearings 28. Disposed between the pinion washer 30 and the first axial end 12 of the pinion 10 is a washer 46. Similarly, a washer 48 of the same type is disposed between the pinion washer 32 and the second axial end 14 of the pinion 10. The pinion washers 30 and 32 are made of a material hard enough so that they can serve as a race of the needle bearings 28.

Upon rotation of the pinion 10, the needle bearings 28 are subjected to the thrust. The integral portions 34 and 36 of the pinion washers 30 and 32 withstand this thrust. It will be appreciated that the integral portions 34 and 36 are of the laminated structure and thus provide structural rigidity high enough to withstand the thrust. Since the integral portions 34 and 36 are inserted between the pinion 10 and the pinion shaft 16, tilting of the pinion washers 30 and 32 is prevented, providing increased performance in withstanding the thrust to which the pinion 10 is subjected.

Figure 3:
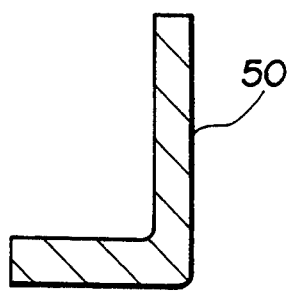
FIG. 3 is a similar view to FIG. 2 showing a modification of a pinion washer.

FIG. 3 shows a modification of a pinion washer 50. This modified pinion washer 50 is substantially the same as the pinion washer 32 except for the increased thickness required to provide a structural rigidity as high as the laminated structure of the integral portion 36 of the pinion washer 32.

Figure 4:
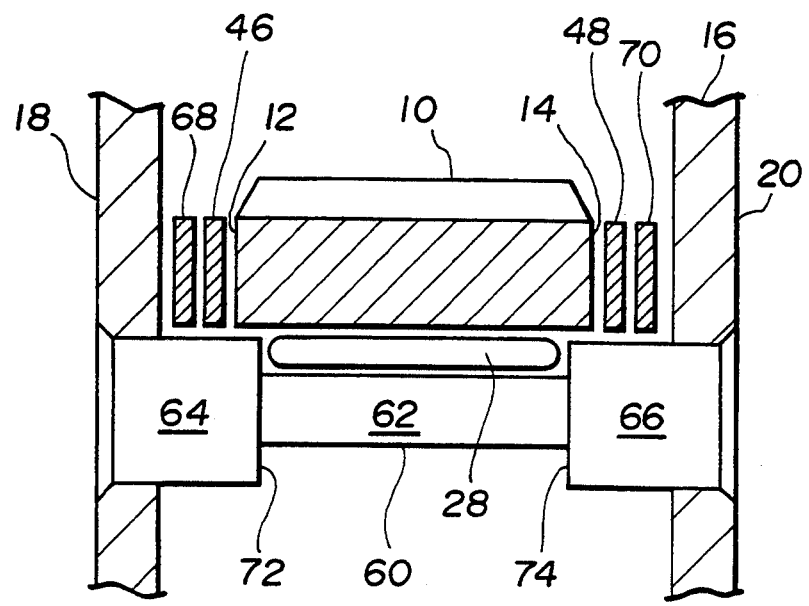
FIG. 4 is a similar view to FIG. 1 showing another embodiment of a planetary gear set.

Referring to FIG. 4, another embodiment of a planetary gear set is described. This embodiment is different from the embodiment illustrated in FIG. 1 in that a pinion shaft 60 has a reduced diameter middle portion 62 between one or first end portion 64 and the opposite or second end portion 66, and pinion washers 68 and 70 are not formed with integral portions to withstand the thrust to which needle bearings 28 are subjected. According to this embodiment, the needle bearings 28 are disposed between the end portions 64 and 66 of the pinion shaft 60. The end portions withstand the thrust to which the needle bearings 28 are subjected. Specifically, a radially extending shoulder 72 between the end portion 64 and the reduced diameter middle portion 62 and a radially extending shoulder 74 between the end portion 66 and the reduced diameter middle portion 62 are thrust acting faces, respectively. Similarly to the embodiment shown in FIG. 1, a washer 46 is disposed between the pinion washer 68 and the one axial end 12 of a pinion 10 and another washer 48 is disposed between the pinion washer 70 and the opposite axial end 14 of the pinion 10.

Figure 5:
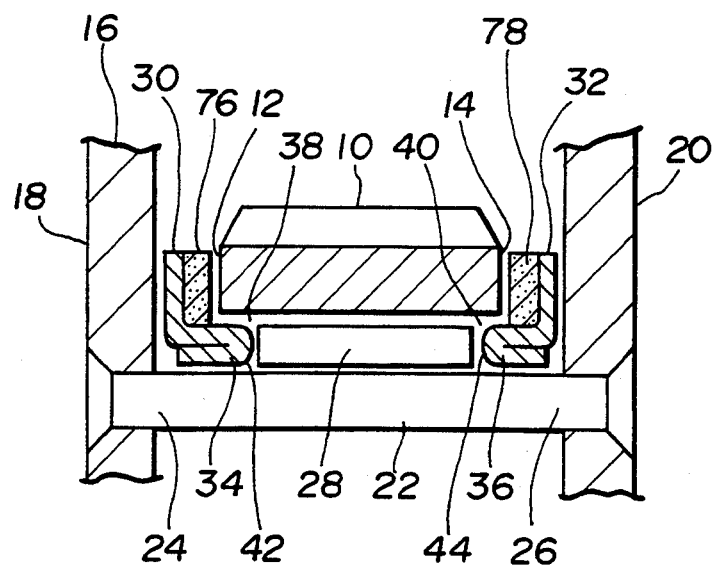
FIG. 5 is a similar view to FIG. 1 showing still another embodiment of a planetary gear set.
Figure 6:
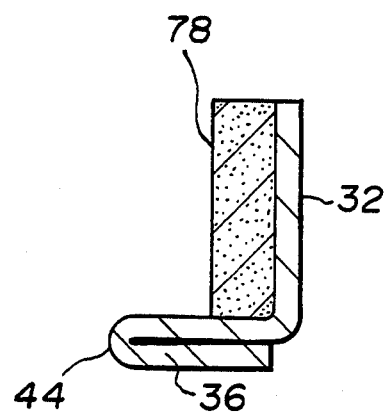
FIG. 6 is an enlarged fragmentary view of a pinion washer illustrated in FIG. 5.

Referring to FIG. 5, still another embodiment of a planetary gear set is described. This embodiment is substantially the same as the embodiment illustrated in FIG. 1 except that pinion washers 30 and 32 have attached thereto bearing members 76 and 78 which are arranged to slidably contact with one and the opposite axial ends 12 and 14 of a pinion 10. FIG. 6 shows in a magnified scale the pinion washer 32 with the bearing member 78. According to this embodiment, the washer 46 and 48 are not required.

Figure 7:
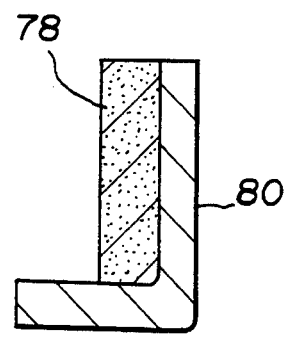
FIG. 7 is a similar view to FIG. 6 showing a modification thereof.

FIG. 7 shows a modification of a pinion washer 80. This modified pinion washer 80 is substantially the same as the pinion washer 32 shown in FIG. 6 except for the increased thickness required to provide a structural rigidity as high as the laminated structure of an integral portion 36 of the pinion washer 32 shown in FIG. 6.

From the previously described embodiments, it will now be appreciated that no O-rings are required to withstand the thrust to which the needle bearings 28 are subjected since the pinion washers 30, 32, 50 and 80 have integral portions to withstand the thrust to which the needle bearings are subjected or the pinion shaft 60 has integral portions 64 and 66 to withstand the thrust. Thus, generation of heat owing to frictional contact of the O-rings with the adjacent pinion washers is eliminated. This causes a reduction in generation of heat during rotation of the pinion 10.

What is claimed is:

1. A bearing arrangement for a planet pinion, said arrangement comprising:
   a pinion having first and second opposite axial ends;
   a carrier;
   a pinion shaft extending through said pinion and having first and second opposite end portions supported by said carrier;
   a needle bearing disposed between said pinion and said pinion shaft and supporting said pinion for rotation about said pinion shaft; and
   a first pair of pinion washers, a first one being disposed between said first axial end of said pinion and the adjacent portion of said carrier, and a second one being disposed between said second axial end of said pinion and the adjacent portion of said carrier,
   each of said pair of pinion washers having an integral sleeve-like structure extending into a space defined between said pinion, said needle bearing and said pinion shaft, and having a thrust acting face arranged to slidably contact with an adjacent axial end of said needle bearing;
   wherein said sleeve-like structure includes an inner peripheral portion of each of said pair of pinion washers, said inner peripheral portion being bent towards said needle bearing and being further bent back over itself.

2. A bearing arrangement for a planet pinion, said arrangement comprising:
   a pinion having first and second opposite axial ends;
   a carrier;
   a pinion shaft extending through said pinion and having first and second opposite end portions supported by said carrier;
   a needle bearing disposed between said pinion and said pinion shaft and supporting said pinion for rotation about said pinion shaft;
   a first pair of pinion washers, a first one being disposed between said first axial end of said pinion and the adjacent portion of said carrier, and a second one being disposed between said second axial end of said pinion and the adjacent portion of said carrier,
   each of said pair of pinion washers having an integral sleeve-like structure extending into a space defined between said pinion, said needle bearing and said pinion shaft, and having a thrust acting face arranged to slidably contact with an adjacent axial end of said needle bearing; and
   a second pair of washers, a first one being disposed between said first axial end of said pinion and said first one of said first pair of pinion washers, and a second one being disposed between said second axial end of said pinion and said second one of said first pair of pinion washers.

3. A bearing arrangement according to claim 2, wherein said second pair of washers are disposed on said sleeve-like structures, respectively.

4. A bearing arrangement for a planet pinion, said arrangement comprising:
   a pinion having first and second opposite axial ends;
   a carrier;
   a pinion shaft extending through said pinion and having first and second opposite end portions supported by said carrier;
   a needle bearing disposed between said pinion and said pinion shaft and supporting said pinion for rotation about said pinion shaft;
   a first pair of pinion washers, a first one being disposed between said first axial end of said pinion and the adjacent portion of said carrier, and a second one being disposed between said second axial end of said pinion and the adjacent portion of said carrier,
   each of said pair of pinion washers having an integral sleeve-like structure extending into a space defined between said pinion, said needle bearing and said pinion shaft, and having a thrust acting face arranged to slidably contact with an adjacent axial end of said needle bearing; and
   a pair of bearing members, a first one being disposed between said first axial end of said pinion and said first one of said first pair of pinion washers, and a second one being disposed between said second axial end of said pinion and said second one of said first pair of pinion washers.

* * * * *